United States Patent [19]

Chili et al.

[11] Patent Number: 5,073,255
[45] Date of Patent: Dec. 17, 1991

[54] WATER TREATMENT APPARATUS

[75] Inventors: Danilo Chili, Bologna, Italy; Ramon Bragos, Barcelona, Spain; William W. Norton, Lincolnshire; Stanley F. Rak, Mundelein, both of Ill.

[73] Assignee: Culligan International Company, Northbrook, Ill.

[21] Appl. No.: 417,580

[22] Filed: Oct. 5, 1989

[51] Int. Cl.⁵ .............................................. C02F 1/42
[52] U.S. Cl. ................................. 210/96.1; 210/98; 210/140; 210/143; 210/190; 210/284
[58] Field of Search ................................ 210/141–143, 210/175, 190, 191, 200, 209, 251, 277, 278, 96.1, 98, 140, 284; 137/624.14, 624.18, 599.1

[56] References Cited

U.S. PATENT DOCUMENTS

| | | | |
|---|---|---|---|
| 2,774,732 | 12/1956 | Blight | 210/24 |
| 3,278,424 | 10/1966 | Griswold | 210/35 |
| 3,509,998 | 5/1970 | Pellett et al. | 210/98 |
| 3,627,133 | 12/1971 | Rak | 210/98 |
| 3,891,552 | 6/1975 | Prior et al. | 210/88 |
| 4,275,448 | 6/1981 | Le Dall | 210/143 |
| 4,298,025 | 11/1981 | Prior et al. | 137/624.14 |
| 4,426,294 | 1/1984 | Seal | 210/143 |
| 4,693,814 | 9/1987 | Brown | 210/88 |
| 4,764,280 | 8/1988 | Brown et al. | 210/662 |

FOREIGN PATENT DOCUMENTS

| | | |
|---|---|---|
| 2652113 | 5/1978 | Fed. Rep. of Germany . |
| 2236787 | 7/1973 | France . |
| 1389530 | 4/1975 | United Kingdom . |

*Primary Examiner*—Ivars Cintins
*Attorney, Agent, or Firm*—Gerstman & Ellis, Ltd.

[57] ABSTRACT

Water treatment apparatus having a raw water inlet and a treated water outlet and at least a first and second water treatment tank plus conduit means for passing water from the inlet to the outlet through the first and second tanks in parallel flow relation. The tanks are automatically regenerated in sequential, alternating intermittent manner in response to predetermined criteria. The tank being regenerated is connected to prevent flow from said tank through the outlet, while the tank not being regenerated is connected to provide flow through the outlet. Accordingly, continuous water treatment, with alternating, intermittent regeneration of the tanks, may be provided.

24 Claims, 6 Drawing Sheets

| TANK 16a | TANK 16b | POSITION | 21a | 22a | 21a | 22b | 23 | 24a | 25a | 24b | 25b |
|---|---|---|---|---|---|---|---|---|---|---|---|
| SERVICE | SERVICE | 1 | O | O | O | O | X | X | X | X | X |
| BRINE RINSE | SERVICE | 2 | X | X | O | O | X | O | O | X | X |
| BACK-WASH | SERVICE | 3 | X | X | O | O | O | O | O | X | X |
| SERVICE | SERVICE | 4 | O | O | O | O | X | X | X | X | X |
| SERVICE | BRINE RINSE | 5 | O | O | X | X | X | X | X | O | O |
| SERVICE | BACK WASH | 6 | O | O | X | X | O | X | X | O | O |

WATER TREATMENT APPARATUS

BACKGROUND OF THE INVENTION

This invention pertains to a method of treating water, and to water treatment apparatus in which a continuous supply of treated water may be provided to the user even though the overall storage capacity of the water treatment apparatus of this invention may be relatively low. This permits the apparatus to be typically placed under a sink or counter, or some other small space. Thus, a household which lacks a basement or any other large space may have the benefit of a continuous supply of softened water from the water treatment apparatus of this invention, even while regeneration of water treatment medium is taking place in the apparatus.

Water softening and other forms of water treatment are well known and units for that purpose are available in a large variety of designs. For example, Blight U.S. Pat. No. 2,774,732 relates to the removal of cations from a liquid in which the liquid is divided into separate streams to pass simultaneously through two or more hydrogen cation exchange units operated in parallel. Individual water treatment units of the Blight patent may be removed from service for regeneration of the units.

By this invention, a water treatment apparatus is provided having automatic regeneration means which permits the apparatus to continuously, without interruption, supply treated water to the user while the apparatus can be automatically regenerated to avoid exhaustion of the water treating capacity.

DESCRIPTION OF THE INVENTION

The invention relates to water treatment apparatus having a raw water inlet and a treated water outlet, and having at least a first and a second water treatment tank plus conduit means for passing water from the inlet to said outlet through the first and second tanks in parallel flow relation. Typically, each water treatment tank contains ion exchange resin for softening water.

In accordance with this invention, means are provided for automatically regenerating the tanks when the tanks are in at least partially exhausted condition. First valve means are provided for flow control and for operatively connecting the automatic regenerating means with the tanks. Means are also provided for controlling the first valve means to automatically cause alternating, intermittent connection between the tanks and the regenerating means in response to predetermined criteria, such as elapsed time or the degree of exhaustion of the ion exchange resin, while the tank connected to the regenerating means is connected to prevent flow from said tank through the outlet. During the regenerating of one of the tanks, the tank not connected to the regenerating means is connected to provide flow through the outlet. As the result of this, continuous water treatment, with alternating, intermittent, automatic regeneration of the tanks, may be provided.

It is preferred for the internal volume of each of the tanks to be no more than about 15 liters, preferably so that the entire apparatus can fit under a household sink in a kitchen or the like, to provide the householder with a continuous supply of treated water even in the circumstance where space is at a great premium. However, the invention can also be used to advantage with larger-sized tanks.

The apparatus of this invention also preferably includes a single chlorination unit for regeneration solution, which is typically saline solution for regenerating ion exchange media. Such a chlorination unit is connectable with each of the tanks, permitting alternating, intermittent flow of chlorinated regenerant from the chlorination unit into the tanks while the tank connected to the chlorination unit is disconnected from the treated water outlet, and the other of said tanks is connected to the inlet and outlet and is disconnected from the chlorination unit. Because of this, antimicrobial chlorination of each tank may take place in alternating manner. Preferably, after chlorinated regenerant has been placed into a tank being so treated, water through the tank can be stopped for a desired period of time, to provide a long-term chlorination of the tank. Heater means may be provided, if desired, to heat chlorinated regenerant from the chlorination unit to a microorganism-killing temperature.

Each tank also preferably connects with a drain line, with second valve means controlling each drain line.

The apparatus of this invention may include a plurality of pressure-controllable flow valves, with the means for controlling the valves including a pilot valve system which comprises a pressurized fluid source, and a pressurized fluid distributor which comprises a pair of relatively rotatable disks having abutting faces. A first conduit communicates between the pressurized fluid source and aperture means in one of the disks communicating with the zone between the abutting faces of the disks. Flow channel means are defined in the zone between said faces, which flow channel means communicate with the aperture means. Ports are defined in the other of the disks, the ports communicating with second conduits that respectively connect with the pressure-controllable flow valves.

As a result of this, the flow valves may be controlled by pressure in the second conduits, the ports individually communicating with the flow channel means in some but not all relative rotational positions of the disks. Pressure may be released when individual flow channel means communicate with a drain port to cause selected valves to change position from their pressure-controlled mode.

Also, means are provided for relatively rotating the disks to control the flow valves in a predetermined manner. Thus, the various valves in the system may selectively be controlled to be either in open or closed position depending upon the relative rotational position of the disks with respect to each other. In the specific embodiment, six different rotational positions are provided for the flow valve, in which the respective pressure-controllable flow valves are opened and closed in differing patterns, for differing functions within the apparatus.

The relatively rotatable disks are preferably made of ceramic material having a Mohs' hardness of at least about 8. This limits decavitation damage that can take place on the hard valve face Also, other forms of wear are greatly reduced by the use of a ceramic valve disk of the type described. Specifically, the ceramic used may be based on aluminum oxide (corundum) or titanium oxide. However, other materials may be used having the requisite hardness, for example topaz, spinel, chrysoberyl, and the like. Preferably, the materials used have a Mohs' hardness of at least 9, including, for example, silicon carbide, having a Mohs' hardness of 9.5.

Additionally, the apparatus of this invention may include third conduits and third valves for directing treated water downstream from the tanks to flow in backflush manner through the tanks in alternating, intermittent manner, while the tank being backflushed is disconnected from the outlet. Thus, brine or other regenerating agent within a given tank may be removed by backflushing prior to placing the tank on line again for use in further water treatment. The backflush water may pass through the drain lines connected with the tanks.

Thus, water may be treated by passing raw water in branched, parallel flow through a plurality of water treatment tanks. As the process proceeds, one automatically regenerates at least one of the tanks, and each tank being regenerated is disconnected at least from the outlet. During this process, one maintains connection of at least one tank between the inlet and outlet so that flow of water through the apparatus and treatment thereof is not interrupted. Thereafter, one places a tank thus automatically regenerated back into connection with the inlet and outlet, and thereafter one automatically regenerates the second water treatment tank while the second tank is disconnected at least from the outlet. Thus, uninterrupted water treatment and flow may is being regenerated.

The automatic regeneration of the apparatus of this invention may be performed as needed, as indicated by measurement of the conductivity of ion exchange resin in the respective tanks, by measurement of the volume of treated water or by elapsed time. Thus, the regeneration process will automatically proceed with great frequency if the water usage is high through the apparatus. However, an overriding timer means in the software which controls the automatic regeneration may be provided to cause a regeneration of each tank to take place at a predetermined, maximum time, for example at least every 96 hours, whether or not there has been any water usage, to control bacteria growth in the tanks and to comply with necessary regulations.

Preferably, a conventional electronic bridge sensor of resin conductivity may be provided, with a volumetric water conductivity meter serving as a backup Thus, the automated system may have two different sensors to evaluate the condition of the ion exchange resin in each tank, to determine the proper time for tank regeneration.

The invention of this application may be used, as stated, with ion exchange water softening units. However, it also may be used with deionization units, or in filter systems, as may be desired.

DESCRIPTION OF DRAWINGS

Referring to the drawings.

DESCRIPTION OF SPECIFIC EMBODIMENT

Figures 1, 2:
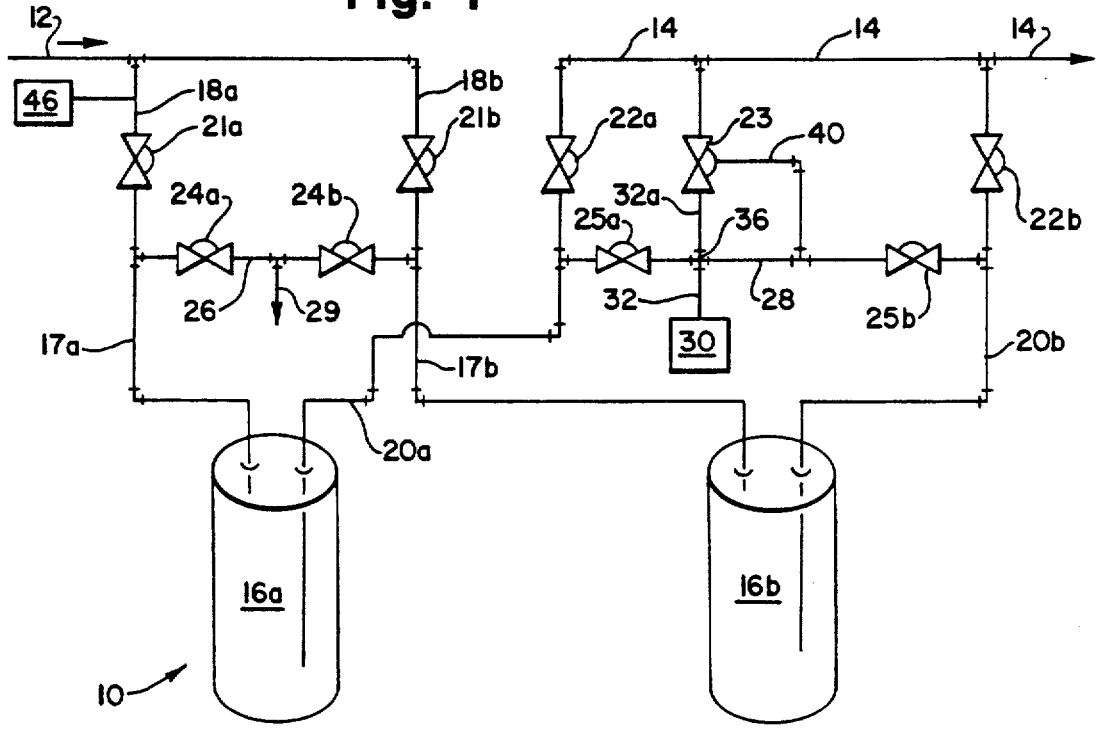
FIG. 1 is a schematic view showing the major flow paths of the water treatment apparatus of this invention.
FIG. 2 is a table showing the six operating configurations of the water treatment apparatus of FIG. 1 and the status of the respective valves in each of such configurations.
Figure 3:
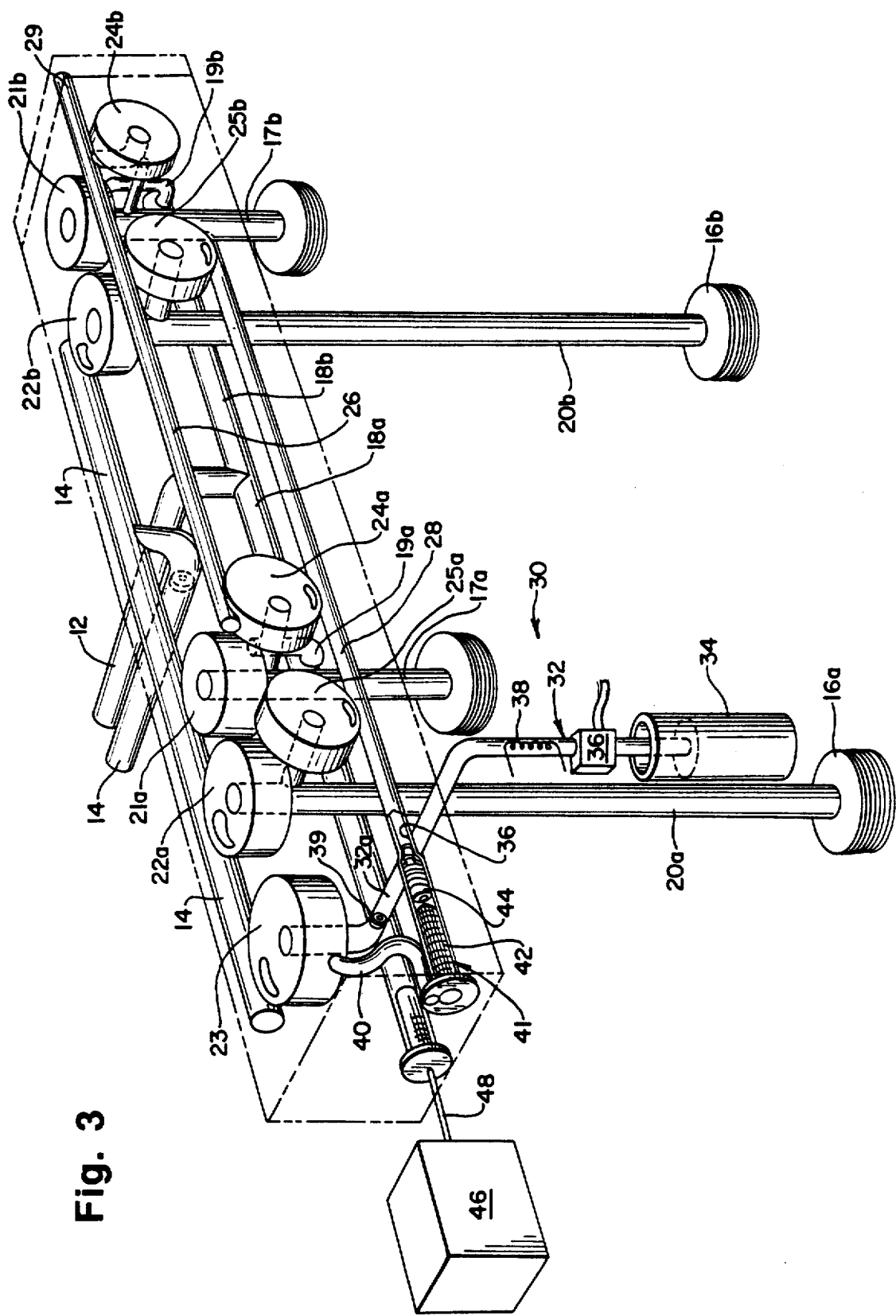
FIG. 3 is a fragmentary perspective view of the major water flow paths in the apparatus of FIG. 1.

Referring to the drawings, schematic FIG. 1 and perspective FIG. 3 show a water treatment apparatus flow scheme having a raw water inlet 12 and a treated water outlet 14. The apparatus includes a pair of water treatment tanks 16a, 16b, the individual tanks being conventional ion exchange resin beds for the softening of water, each tank being typically of a conventional overall design, but miniaturized, each carrying typically 4 to 10 liters of ion exchange resin.

Conduit means 18a, 18b are provided for passing raw water from inlet 12 to flow valves 21a, 21b, and then through lines 17a, 17b the first and second tanks 16a, 16b in parallel flow relation. Conduits 20a, 20b extend from the respective tanks to water outlet 14.

Flow through conduits 18a, 18b is controlled by means of flow valves 21a, 21b. Likewise, outflow from tanks 16a, 16b through conduits 20a, 20b is controlled by valves 22a, 22b.

Drain valves 24a, 24b are carried on a drain conduit 26 which communicates through valves 24a, 24b with lines 17a, 17b, and is open to a drain port 29.

Backflush valve 23 controls flow between water outlet 14 and flush line 28. Flush line 28 communicates with both of lines 20a and 20b, with back flow being controlled by the respective valves 25a, 25b. Thus, if valves 23, 25a are both open, processed water from outlet 14 can pass through flush line 28 to flow rearwardly through conduit 20a for backflushing of container 16a. If valve 25a is closed and valve 25b is open, processed water can flow rearwardly through open valve 23, flush line 28, and line 20b to backflush container 16b.

Brine source 30 may comprise a conduit 32 that leads from valve 23 and intersects through flush line 28, to communicate with a vented salt tank 34 (FIG. 3). Source 30 may be of conventional design for supplying brine for regeneration of ion exchange tanks 16a, 16b.

A shunt channel 40 provides a constantly open flow connection between lines 14 and 28.

A source of chlorine 36, typically electrochemically produced, may be provided to provide chlorine to the brine solution as it passes from tank 34 into flush line 28, and from there to tanks 16a or 16b in alternating, sequential manner. The chlorinated brine may be heated by heating coil 38, with one of the respective tanks 16a, 16b being filled with the chlorinated brine during the backflushing stage. Line 32 communicates with backflush line 28 at intersection 36, but line 32 defines an extension 32a that communicates with valve 23 as shown in FIG. 3. A flow restrictor 39 (FIG. 3) is positioned in line extension 32a to limit the flow through that line. An aspirator nozzle 44 is positioned at intersection 36 so that brine is drawn into backflush line 28 from line 32 by flowing backflush water in line 28 which passes through either of open valves 25a or 25b.

Thus the apparatus of this invention can function in several modes. In normal operating mode, raw water from inlet 12 passes through valves 21a, 21b in parallel flow relation to pas through water treatment tanks 16a, 16b, and then to be conveyed through lines 20a, 20b through valves 22a, 22b to processed water outlet 14.

However, when it is time to regenerate water treatment tank 16a, valve 22a may be closed, and processed water in outlet line 14 may pass through channel 40, to cause brine from system 30 to be drawn into the flowing system and carried along flush line 28 through valve 25a into treatment tank 16a. Simultaneously, valve 21a will be closed and valve 24a will be open. The connection of water inlet 12 to outlet 14 through processing tank 16b remains open to provide continuous water pressure in outlet line 14. Thus, saline water passing through tank 16a will be drawn out of line 17a, to pass through valve 24a and out of drain line 26. In this way, tank 16a may be regenerated while tank 16b remains in its duty mode to provide a supply of treated water.

If desired, chlorine in any conventional form may also be provided from chlorine supply 36 to the flow of water being drawn by Venturi system or aspirator 44 from line 32. At some point in the regeneration process, when tank 16a is filled with chlorinated water, one or both of valves 24a, 25a may be closed for a desired period of time to cause the chlorinated water in tank 16a to reside there, for antimicrobial activity.

Then, to rinse the regenerated tank 16a, valve 23 may be opened, to disable aspirator 44 so that brine is no longer drawn from the line 32. Thus, processed water from outlet line 14 flows in backflush manner without added saline through valve 23 and tank 16a, and out drain 29, until the spline and chlorine present in tank 16a and lines 17a, 20a have been removed. Then, the respective valves may be configured so that water flows once again through lines 18a, 17a tank 16a, and line 20a to provide processed water to outlet 14.

At a desired time, the corresponding valves may be respectively opened and closed to cause the same backflush process to take place in tank 16b, while tank 16a remains on duty to provide pressurized, processed water to outlet line 14.

FIG. 2 is a table showing the respective valve positions for six modes of operation of the apparatus illustrated in the drawings. At the top of the nine right hand columns of FIG. 3 are the specific valves to which each column refers. The symbol "O" is open, while "X" means that the valve is closed.

When valve 23 is open, during the backwash cycle of each tank 16a, 16b after the brine rinse, water can flow through line 32a into line 32 to replenish the water supply in salt tank 34. Also, valve 23 is constantly open to continuous flow from outlet line 14 through line 40 (FIG. 3) to the eductor system 41 of flush line 28. Water flows through filter screen 42 and aspirator 44 into line 28. However, no flow along flush line 28 normally takes place when both valves 25a, 25b are closed.

In the apparatus shown, the means for controlling the valve position is automatic, to cause the valves to assume their respective open or closed configurations in each of the six possible positions of the specific device shown, which are labelled with position numbers 1 through 6 in FIG. 2. These respective valve positions are, in turn, produced by a pressure-distributing pilot valve system, shown generally at 46 in FIG. 3, which taps off pressurized water from inlet line 18a through pressure line 48.

Figure 4:
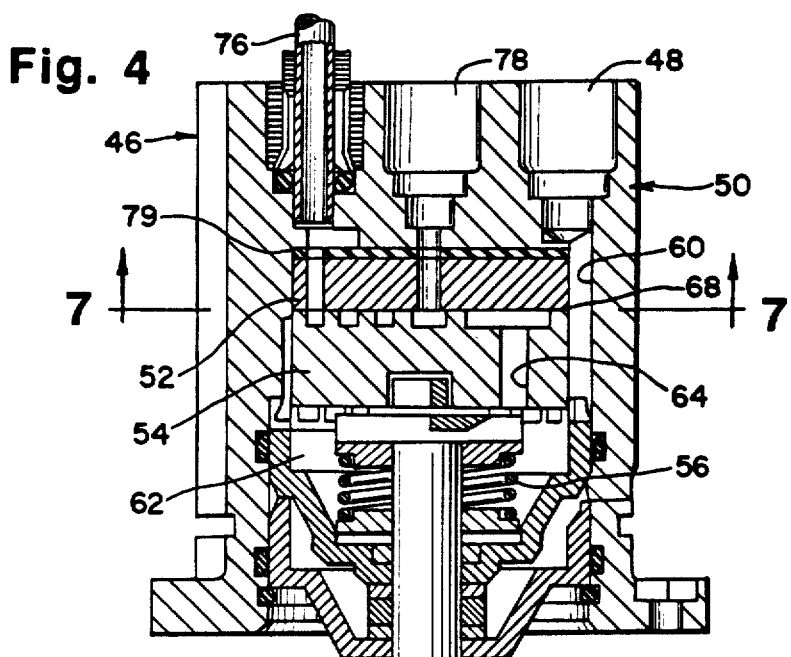
FIG. 4 is a fragmentary elevational view, taken partly in section, showing the pilot valve assembly of the water treatment apparatus of FIG. 1.

FIG. 4 is a fragmentary, elevational view, taken partly in section, of pilot valve system 46. Pressure line 48 communicates between inlet line 18a and the interior of housing 50, which may be made of acetal plastic or the like, such as Delrin plastic, sold by DuPont. The heart of pilot valve system comprises a first disk 52 and second disk 54 which are held together in abutting relation by compression spring 56. First disk 52 is carried in stationary manner within housing 50.

Figure 7:
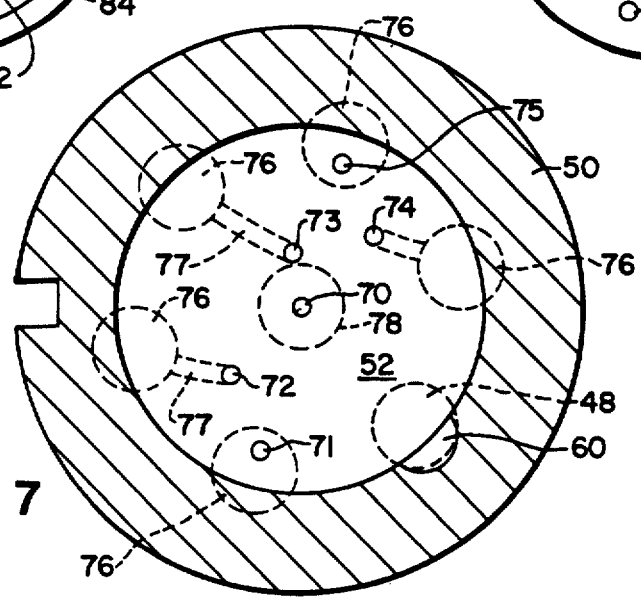
FIG. 7 is a view of the upper disk of FIG. 4, shown in its mounted position, taken along line 7—7 of FIG. 4.

FIG. 7 is a view looking upwardly at first disk 52 and housing 50. The connection with pressure line 48 can be seen, along with a cutaway portion 60 of housing 50, which permits the inflow of pressurized liquid through line 48, and around both disks 52, 54 to a chamber 62 (FIG. 4) within housing 50 behind second disk 54.

Figure 5:
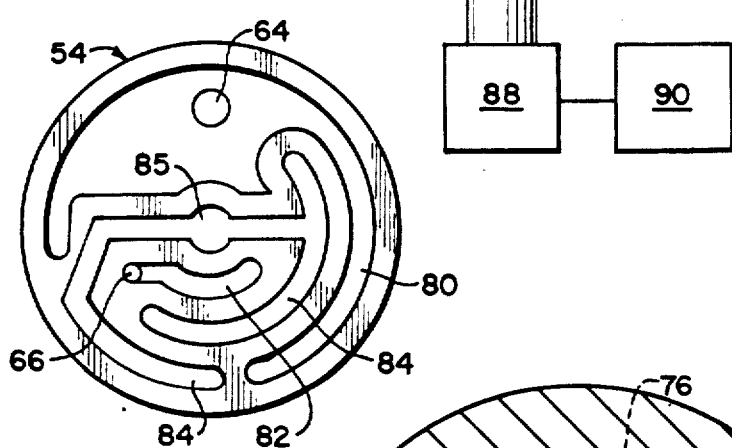
FIG. 5 is a top plan view of the lower abutting disk as shown in FIG. 4.
Figure 6:
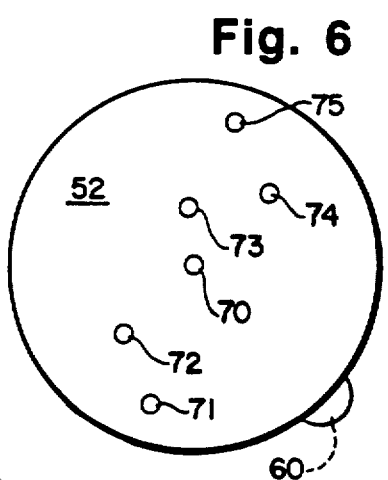
FIG. 6 is a bottom plan view of the upper abutting disk of FIG. 4.

From there, the pressurized liquid has access to a pair of apertures 64, 66 in second disk 54, to provide fluid communication through that disk to the interface 68 between the two disks. FIGS. 5 and 6 show the respective faces of disks 52, 54 that face each other along interface 68.

Both disks 52, 54 are preferably made of a ceramic based on aluminum oxide or titanium oxide, to have a Mohs' hardness of at least about 9, for purposes of wear resistance as described above.

First, stationary disk 52 also defines a series of apertures 70–75 which extend through disk 52. Apertures 71–75 communicate respectively with various fluid flow lines 76 which communicate to the respective valves 21–25. Valves 21–25 are of the pressure operated, diaphragm-type, for opening and closing in response to pressure that is applied to them by the particular fluid flow line 76 to which such valve is connected. Specifically, aperture 71 can communicate through a fluid flow line 76 to valves 24b and 25b; aperture 72 communicates in similar manner to valves 21a and 22a; aperture 73 communicates with valve 23; aperture 74 communicates with valves 21b and 22b, and aperture 75 communicates with valves 24a and 25a.

Aperture 70 communicates with a drain line 78, to permit pressurized water to flow through and out of the system to permit depressurization of the valves.

As shown in FIG. 5, the face of second disk 54 which abuts first disk 52 defines channels 80 that communicate with aperture 64, plus a second channel 82 that communicates with aperture 66. Drain channels 84 are also provided, communicating with central area 85, from where water can flow into drain port 70 to release pressure to cause a change in condition in one or more of valves 21–25, as predetermined.

Second disk 54 is rotated by shaft 86 which, in turn, can be rotated by motor 88 to cause second disk 54 to rotate between six different equidistantly spaced rotational positions relative to first disk 52. Each of these rotational positions corresponds to a valve position one through six as indicated in FIG. 2. The angular relationship of the network of channels 80, 82, 84 provides a varying pattern of communication between the pressurized water in channels 80, 82, drain channel 84, and the respective apertures 70–75. Thus, in a first rotational position of second disk 54 with respect to first disk 52, valve opening pressure is communicated between disks 52, 54 and the appropriate apertures 71–75 to cause valves 21a through 22b to be open, and valves 23 through 25b to be closed, as specified in FIG. 2. Then, second disk 54 can be rotated 60 degrees into the second position in which valves 21a, 22a, 23, 24b, and 25b are closed, while the remaining valves are open. A further 60 degree rotation of second disk 54 causes the configuration of pilot valve position three to be achieved, followed by further 60 degree rotations to achieve positions 4, 5 and 6 of the valve configurations.

Thus, microprocessor 90 can provide a logic system to operate motor 88 to rotate second disk 54 in a desired manner, to automatically provide the desired operating modes of the apparatus of this invention, providing brine rinse when needed to each of tanks 16a, 16b in sequential manner, with chlorine or another disinfectant added if desired, followed by an automatic back wash, all being as timed and commanded by software 90, simply by appropriate rotary movement of second disk 54 from one position to the next.

Channels 77 (FIG. 7) are provided as necessary between first, stationary disk 52 in its abutting interface 79 with housing 50 to provide the desired communication between the respective apertures 72, 73, 74 and the connecting fluid flow lines 76, as may be needed. A gasket as shown may be provided at interface 79.

Figure 8:
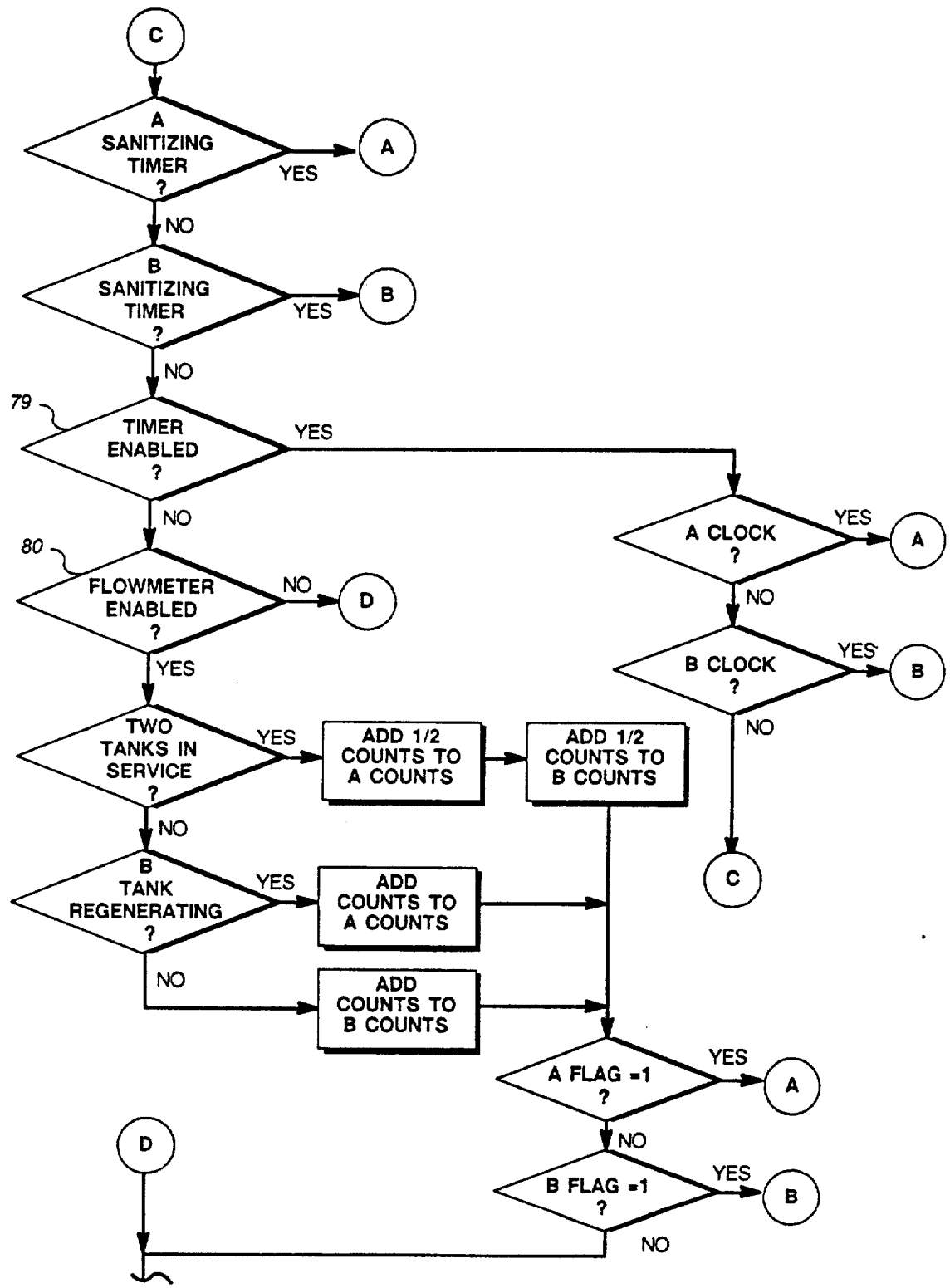
FIGS. 8-10 are flow diagrams illustrating the automated functioning of this invention.
Figure 9:
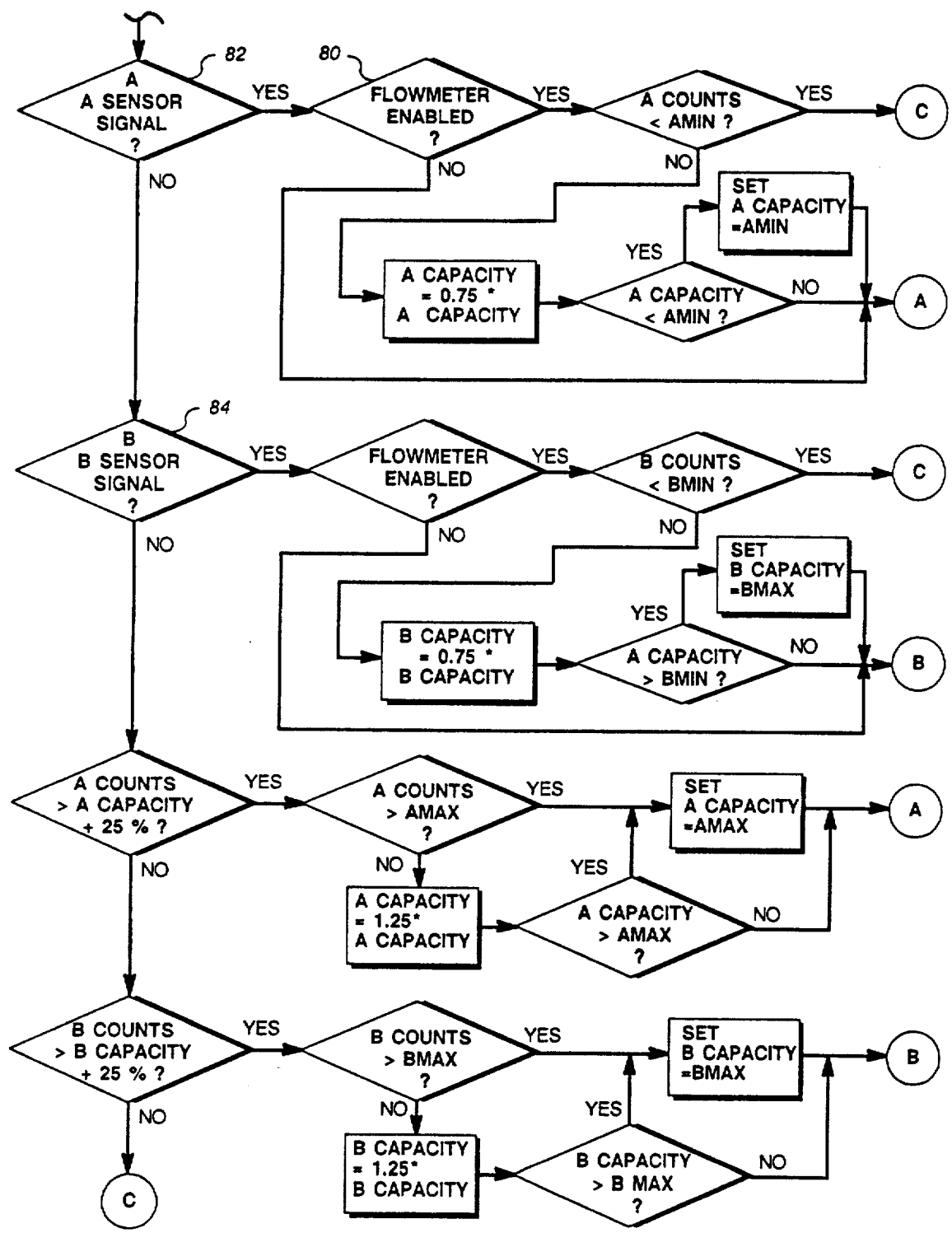
Figure 10:
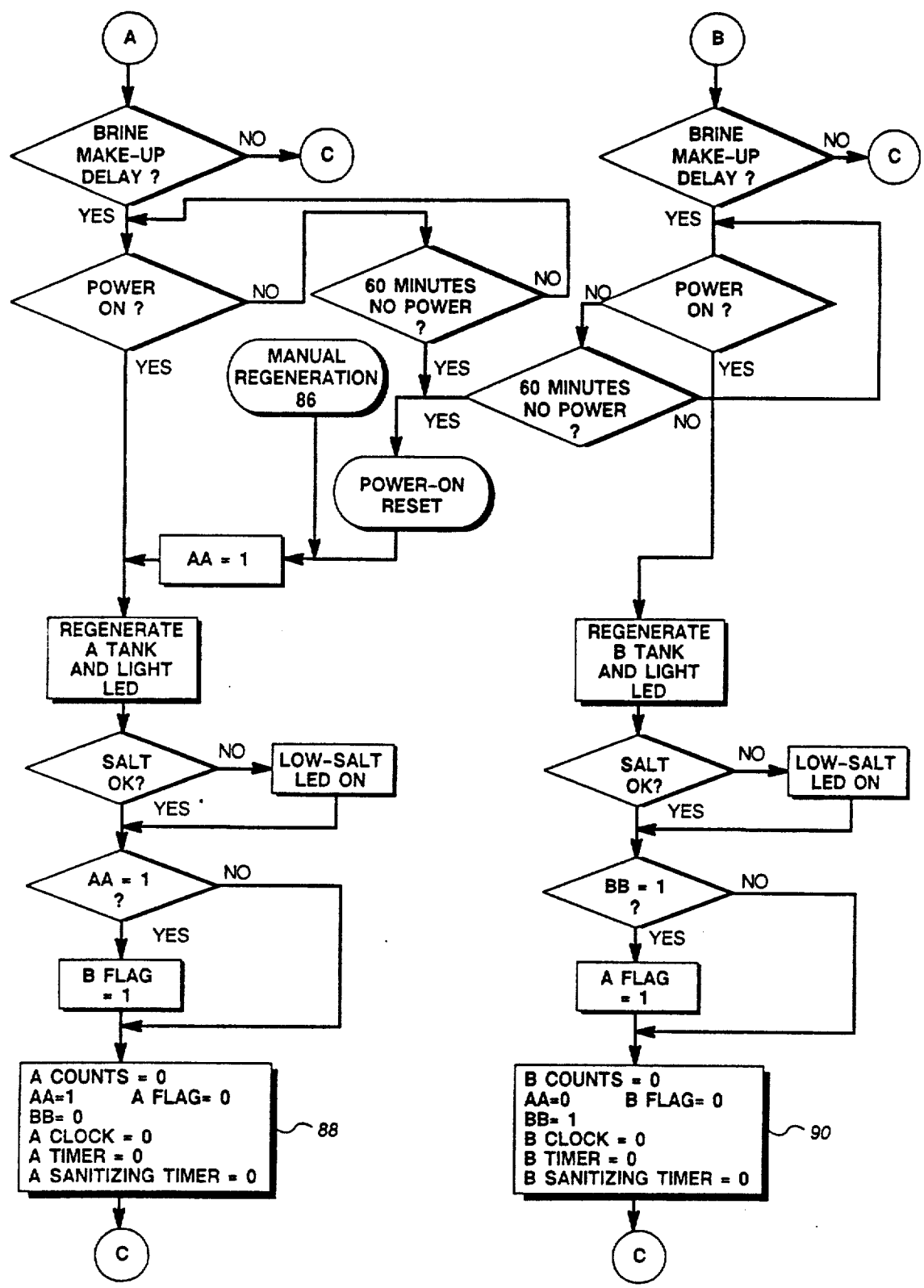

A flow chart for the software of microprocessor 90 is provided, showing one means for automatic operation of the water treatment apparatus of this invention. Referring to FIGS. 8-10, three routines A, B, and C are shown, together forming a closed loop process. Routine C basically relates to the water softening operation of the apparatus, while routines A and B relate to the regeneration of the respective tanks 16a, 16b.

Referring to FIG. 8, routine C begins with the inquiry of freshening timer A. If a predetermined time has elapsed, the system goes to routine A to regenerate tank 16a. If not, the system checks freshening timer B. If the time predetermined on the timer has elapsed, the system goes to routine B to regenerate tank 16b. Thus tanks 16a and 16b can be regenerated per routines A and B with certain timing. Timers A and B are generally set at 96 hours or less.

Then, the determination is made if the general timer 79 is enabled. If yes, A-clock is consulted. The letter A relates generally to functions pertaining to tank 16a while the letter B relates to functions pertaining to tank 16b. Clocks A and B may be set by the user to cause the system to regenerate the respective tanks 16a, 16b at a predetermined, certain time. Thus, when the predetermined time on A-clock is reached, the system shifts to routine A, which is shown in FIG. 10. If not, B-clock is consulted, and if B-clock has recorded the predetermined time, the system shifts to routine B, which is also shown on FIG. 10. Otherwise the system restarts routine C again. Thus the A and B-clocks provide a second, absolute, certain-time regeneration schedule for the system of this invention.

When timer 79 is not enabled, the question is asked if a single flow meter 80 is enabled. Flow meter 80 measures water flow through both tanks 16a, 16b. If the flowmeter is not enabled, the system skips to "D" at the bottom of FIG. 8. If the flowmeter is enabled, the system then inquires about two tanks 16a, 16b in service. If both tanks are in service, one half of the recorded meter counts are added to an A-COUNTS value, and one half of the recorded meter counts are added to a B-COUNTS value. The one half of the meter counts is added to each of the A-COUNTS and B-COUNTS values since both tanks are in service and meter 80 is measuring the flow through both of them. If a "no" answer to Two Tanks in Service is determined, the next question is a determination of B-Tank (16b) Regenerating. If yes, one adds the full meter counts from meter 80 to A-COUNTS. If B-tank is not regenerating, that means that A-tank (16a) is regenerating, and one adds the full meter counts to B-COUNTS.

Following these three alternate functions, it is determined whether or not A-flag equals one. If yes, the system proceeds to routine A. If no, it is determined whether B-flag equals one. If yes, the system proceeds to routine B. If no, the system proceeds to a resin conductivity sensor subroutine. A-flag and B-flag have permissible values of zero or one. As stated above, the presence of a "one" value will cause shifting from routine C to routines A or B respectively for regeneration of the tanks. The "one" values of the respective A and B-flags are determined by signals from the respective resin conductivity sensors described immediately below, or from totals of counts from flow meter 80 that exceed preset limits, from "power-on" reset signals, or from an error signal which is generated when one tanks regenerates twice without a signal for the other tank to regenerate. The "zero" values are set each time on the respective A-flag and B-flag when its corresponding tank is regenerated.

The previous functions beginning with meter input 80 relate to a meter control subsystem of the apparatus. The subsequent functions relate to a parallel resin conductivity sensor control of the same apparatus. Such resin conductivity sensors are sold by Culligan International Company under the trademark AQUASENSOR.

It is first determined whether resin conductivity sensor 82 is generating a signal, (A-SENSOR 82 is for tank 16a and B-SENSOR 84 is for tank 16b). If yes, it is determined whether flow meter 80 is enabled. If yes, it is determined whether A-COUNTS is greater than A-MIN. A-MIN is a value that may be manually set, typically initially at 4500 counts. It can be seen that through this routine C that A-COUNTS will become a floating value that can vary to alter the timing of resort to routine A for regeneration of the tank 16a. This variation takes place automatically, in response to the perceived need for regeneration, depending upon the condition of resin in tank 16a, the water hardness being encountered, and the like. If A-COUNTS is less than A-MIN, the system recycles to the top of routine C again. If no, A-CAPACITY is multiplied by 0.75 to become a reduced value. A-CAPACITY is then checked to see if it is smaller than A-MIN. If yes, A-CAPACITY is set to equal A-MIN and regeneration routine A is performed. If no, regeneration routine A is performed immediately. The purpose of this last subroutine is to allow the count variables to decrease if the inlet water has increased hardness, but does not allow the variables to decrease below a preset minimum value.

If the flow meter 80 is not enabled after determination of a positive reading of A SENSOR 82, routine A is immediately performed.

The above constitutes one subroutine for control of the regeneration schedule of tank 16a.

If A-SENSOR does not indicate positive indication of the need for regeneration of the resin, B-SENSOR 84 is queried for positive reading, B-sensor 84 being connected to the resin in tank 16b. If the answer is yes, a subroutine is performed which is identical to the previous subroutine, for the setting of B-CAPACITY and the institution of routine B.

If neither A-SENSOR 82 nor B-SENSOR 84 provides a positive indication relative to resin conductivity, the question is asked whether A-COUNTS is greater than A-capacity plus 25 percent. If yes, the question is asked whether A-COUNTS is greater than A-max, which may initially be set at 90,000 COUNTS. If yes, A-CAPACITY is set to equal A-MAX and regeneration routine A is initiated. If A-COUNTS is not greater than A-MAX, A-CAPACITY is multiplied by 1.25 to set a new A-CAPACITY. The question is then asked whether A-CAPACITY is greater than A-MAX. If yes, A-CAPACITY is set to equal A-MAX and regeneration routine A is initiated. If no, regeneration routine A is directly initiated.

The purpose of this last subroutine is that, if for some reason a resin sensor reading is not received, but the flow meter counts exceed the capacity counts set at "power on" reset, or the hardness setting and therefore the A and B-MAX counts are modified by the program, then either or both of A-CAPACITY and B-CAPACITY will be adjusted upwards, but only to a maximum value. This feature is to protect against the failure of a resin sensor to send a signal as for instance during a brief power failure during which water is used and loss of softening capacity in either tank 16a or 16b is not sensed. When A-CAPACITY has been reset by its subroutine, B-CAPACITY may then be reset in similar manner.

By these means, a variable control cycle for the regeneration of tank 16a may be provided. Accordingly, B-CAPACITY may be variably set as well as A-CAPACITY so that the regeneration schedules of tank 16b and 16a may be dependent upon the findings of B-SENSOR 84 and its own sensor 82, which in turn may be dependent upon, and variable with, the hardness of the water being processed, the condition of the resin in tank 16b and tank 16a and the like.

Turning to FIG. 10, the regeneration routines A and B are shown in an interconnecting scheme.

In both cases, inquiry is made as to the adequacy of the brine present in tank 34 for regeneration. If the brine is inadequate for the regeneration, the system is recycled to routine C. If the brine is adequate, in each case of routines A and B inquiry is made as to whether the power is on for the regeneration routine. If yes, the appropriate tank is regenerated. If no, a 60 minute timer is consulted to determine elapsed time since the last time the power was on. If the 60 minutes is not elapsed, the system is recycled until the 60 minutes has elapsed, at which time in both cases a "power-on" reset takes place when power is on again.

Manual regeneration can also take place by the activation of a regeneration switch 86. With the resetting of the "power-on", flag AA is set to one.

With the "power-on", whether directly through the "power-on" query or after setting flag AA to one, A-tank 16a is regenerated, and an LED is lit to indicate the regeneration step. The salt level in the brine tank is electronically monitored, and if the salt concentration is low, a low-salt LED is lit. If the salt concentration is within proper limits, the question is asked whether flag AA equals one. If yes, B-FLAG is set to one which causes the initiation of regeneration routine B in the course of routine C (see FIG. 8). If AA does not equal one, the B-flag setting step is by-passed, and in either case the values in step 88 are reset so that A-COUNTS equals zero, flag AA equals one, A-flag equals zero, flag BB equals zero, A-clock equals zero, A-TIMER equals zero, and A-SANITIZING TIMER equals zero. Then, the system cycles to routine C, with tank 16a being freshly regenerated.

With routine B being initiated, and the "power-on" confirmed, B-tank 16b is regenerated and the regeneration LED is lit. As in routine A, salt level is monitored, and inquiry is made as to whether flag BB is one. If yes, A-FLAG is made equal to one, and if no, the latter step is circumvented, followed by a resetting in step 90 of B-COUNTS to zero, flag AA to zero, flag BB to one, B-FLAG to zero, B-CLOCK to zero, and B-TIMER to zero.

Thus, by the above interaction of routines A, B and C, a water treatment apparatus is provided in which the multiple tanks, in parallel flow relation, may be automatically regenerated under conditions which may vary according to predetermined circumstances, or directly set to certain regeneration times, as may be desired. At the same time, a continuous flow of treated water may be available to the user, without interruption. The device may, if desired, be small enough for convenient use in an apartment or the like.

The above has been offered for illustrative purposes only, and is not intended to limit the scope of the invention of this application, which is as defined in the claims below.

That which is claimed is:

1. In water treatment apparatus having a raw water inlet and a treated water outlet, and having at least a first and a second water treatment tank plus conduit means for passing water from said inlet to said outlet through said first and second tanks in parallel flow relation, the improvement comprising, in combination:
   means for automatically regenerating said tanks when said tanks are in at least partially exhausted condition; first valve means for flow control and for operatively connecting said automatic regenerating means with said tanks and means for controlling said first valve means to automatically cause alternating, intermittent connection between said tanks and said regenerating means in response to predetermined criteria while the tank connected to the regenerating means is connected to prevent flow from said tank through said outlet, and while the tank not connected to said regenerating means is connected to provide flow through said outlet, drain line means communicating with each tank, and second valve means controlling each drain line means to open said drain line means to receive spent regenerating solution from the tank undergoing regeneration and to automatically close off said drain line means from the tank not connected to said regenerating means, whereby continuous water treatment normally in parallel flow, with alternating, intermittent regeneration of said tanks, may be provided.

2. The apparatus of claim 1 in which the internal volume of each of said tanks is no more than about 15 liters.

3. The apparatus of claim which further comprises a source of regenerant as part of said automatic regenerating means; and a single regenerant chlorination unit connectable with each of said tanks, permitting alternating, intermittent flow of chlorinated regenerant from said chlorination unit into said tanks while the tank connected to the chlorination unit is disconnected from the treated water outlet and the other of said tanks is connected to said inlet and outlet and disconnected from said chlorination unit.

4. The apparatus of claim 3 in which said first valve means permits each tank to be filled with chlorinated regenerant and to then stand without flow for a predetermined time, while the other tank is connected to said inlet and outlet.

5. The apparatus of claim 3 in which heater means are provided to heat chlorinated regenerant from said chlorination unit to kill microorganisms.

6. The apparatus of claim 1 in which is a water softening apparatus.

7. The apparatus of claim 1 including third conduits and third valves for directing treated water downstream from said tanks to flow in backflush manner through said tanks in alternating, intermittent manner, while the tank being backflushed is disconnected from said outlet.

8. The apparatus of claim 1 in which said means for automatically regenerating said tanks includes sensor means determining the need for regeneration of each tank by at least one of the measurement of the conductivity of resin in the respective tanks and the measurement of the volume of water treated, plus overriding timer means to cause regeneration in each tank to take place at a predetermined maximum time interval even if the need for such regeneration is not sensed.

9. In water treatment apparatus having a raw water inlet and a treated water outlet, and having at least a first and a second water treatment tank plus conduit means for passing water from said inlet to said outlet through said first and second tanks in parallel flow relation, the improvement comprising, in combination:

means for automatically regenerating said tanks when said tanks are in at least partially exhausted condition; first valve means for flow control and for operatively connecting said automatic regenerating means with said tanks, and means for controlling said valve means to automatically cause alternating, intermittent connection between said tanks and said regenerating means in response to predetermined criteria while the tank connected to the regenerating means is connected to prevent flow from said tank through said outlet, and while the tank not connected to said regenerating means is connected to provide flow through said outlet, whereby continuous water treatment normally in parallel flow, with alternating, intermittent regeneration of said tanks, may be provided; a source of regenerant as part of said automatic regenerating means; a single regenerant chlorination unit connectable with each of said tanks permitting alternating, intermittent flow of chlorinated regenerant from said chlorination unit into said tanks while the tank connected to the chlorination unit is disconnected from the treated water outlet, and the other of said tanks is connected to said inlet and outlet and disconnected from said chlorination unit; and third conduits and third valves for directing treated water downstream from said tanks to flow in back flush manner through said tanks in alternating, intermittent manner while the tank being back flushed is disconnected from said outlet; said first valve means including a plurality of pressure-controllable flow valves, and said means for controlling said first valve means including a pilot valve which comprises a pressurized fluid source, a pressurized fluid distributor which comprises a pair of relatively rotatable disks made of a material having a Mohs' hardness of at least 8, and having abutting faces; a first conduit communicating between said pressurized fluid source and aperture means in one of said disks communicating with the zone between said abutting faces; flow channel means defined in said zone and communicating with said aperture means; ports defined in the other of said disks, said ports communicating with second conduits that respectively connect with said pressure-controllable flow valves whereby said flow valves are controlled by pressure in said second conduits, said ports individually communicating with said flow channel means in some but not all relative rotational positions of said disks; means for releasing pressure in selected ports at selected rotational positions of said disks; and means for relatively rotating said disks to control said control valves in a predetermined manner.

10. The apparatus of claim 9 including drain line means communicating with each tank, and second valve means controlling each drain line means.

11. The apparatus of claim 10 in which heater means are provided to heat chlorinated water from said chlorination unit such that the combination of chlorine, heat and brine of the regenerant will kill microorganisms, and said first valve means permits each tank to be filled with chlorinated regenerant and to then stand without flow for a predetermined time, while the other tank is connected to said inlet and outlet.

12. The apparatus of claim 9 in which said rotatable disks are made of a ceramic comprising aluminum oxide or titanium oxide.

13. The apparatus of claim 12 which is a water softening apparatus in which the internal volume of each of said tanks is no more than about 100 liters.

14. In water treatment apparatus having a raw water inlet and a treated water outlet, and having at least a first and a second water treatment tank plus conduit means for passing water from said inlet to said outlet through said first and second tanks in parallel flow relation, the improvement comprising, in combination:

means for automatically regenerating said tanks when said tanks are in at least partially exhausted condition; first valve means for flow control and for operatively connecting said automatic regenerating means with said tanks, and means for controlling said first valve means to automatically cause alternating, intermittent connection between said tanks and said regenerating means in response to predetermined criteria while the tank connected to the regenerating means is connected to prevent flow from said tank through said outlet, and while the tank not connected to said regenerating means is connected to provide flow through said outlet, whereby continuous water treatment, with alternating, intermittent regeneration of said tanks, may be provided; in which said first valve means includes a plurality of pressure-controllable flow valves, and said means for controlling said first valve means includes a pilot valve which comprises a pressurized fluid source, a pressurized fluid distributor which comprises a pair of relatively rotatable ceramic disks having a Mohs' hardness of at least about 9 and having abutting faces; a first conduit communicating between said pressurized fluid source and aperture means in one of said disks communicating with the zone between said abutting faces; flow channel means defined in said zone and communicating with said aperture means; ports defined in the other of said disks, said ports communicating with said conduits that respectively connect with said pressure-controllable flow valves whereby said flow valves are controlled by pressure in said second conduits, said ports individually communicating with said flow channel means in some but not all relative rotational positions of said disks; means for releasing pressure in selected ports at selected rotational positions of said disks; means for relatively rotating said disks, to control said flow valves in a predetermined manner; and third conduits and third valves for directing treated water downstream from said tanks to flow in back flush manner through said tanks in alternating, intermittent manner while the tank being back flushed is disconnected from said outlet 15. The apparatus of claim 14 including drain line means communicating with each tank, and second valve means controlling each drain line means.

16. The apparatus of claim 15 in which said rotatable disks are made of a ceramic comprising aluminum oxide or titanium oxide.

17. The apparatus of claim 16 which is a water softening apparatus in which the internal volume of each of said tanks is no more than about 5 liters.

18. In water treatment apparatus having a raw water inlet and a treated water outlet, and having at least a first and a second water treatment tank plus conduit means for passing water from said inlet to said outlet through said first and second tanks in parallel flow relation, the improvement comprising, in combination: means for automatically regenerating said tanks when said tanks are in at least partially exhausted condition; first valve means for flow control and for operatively connecting said automatic regenerating means with said tanks, and means for controlling said first valve means to automatically cause alternating, intermediate connection between said tanks and said regenerating means in response to predetermined criteria while the tank connected to the regenerating means is connected to prevent flow from said tanks through said outlet, and while the tank is not connected to said regenerating means is connected to provide flow through said outlet, said first valve means including a plurality of pressure-controllable flow valves, and said means for controlling said first valve means comprises a pilot valve system which comprises a pressurized fluid source, a pressurized fluid distributor which comprises a pair of relatively rotatable disks having abutting faces; a first conduit communicating between said pressurized fluid source and aperture means in one of said disks communicating with the zone between said abutting faces; flow channel means defined in said zone and communicating with said aperture means; ports defined in the other of said disks, said ports communicating with second conduits that respectively connect with said pressure-controllable flow valves whereby said flow valves are controlled by pressure variations in said second conduits, said ports individually communicating with said flow channel means in some but not all relative rotational positions of said disks; means for releasing pressure in selected ports at selected rotational positions at said disks; and means for relatively rotating said disks to control said valves in a predetermined manner; whereby continuous water treatment normally in parallel flow, with alternating, intermediate regeneration of said tanks, may be provided.

19. The apparatus of claim 18 in which said relatively rotatable disks are made of a ceramic material having a Mohs' hardness of at least 8.

20. The apparatus of claim 19 in which said rotatable disks are made of a ceramic comprising aluminum oxide or titanium oxide.

21. The apparatus of claim 18 in which said relatively rotatable disks are made of a ceramic material having a Moh's hardness of at least 9.

22. The apparatus of claim 21 in which the internal volume of each of said tanks is no more than about 15 liters.

23. The apparatus of claim 21 which further comprises the source of regenerant as part of said automatic regenerating means; and a single regenerant chlorination unit connectible with each of said tanks, permitting alternating, intermittent flow of chlorinated regenerant from said chlorination unit into said tanks while the tank connected to the chlorination unit is disconnected from the treated water outlet and the other of said tanks is connected to said inlet and outlet and disconnected from said chlorination unit.

24. The apparatus of claim 18 in which said means for automatically regenerating said tanks includes sensor means determining the need for regeneration of each tank by at least one of the measurement of the conductivity of resin in the respective tanks and the measurement of the volume of water treated, plus overriding timer means to cause regeneration in each tank to take place at a predetermined maximum time interval even if the need for such regeneration is not sensed.

* * * * *